(12) United States Patent
Wada et al.

(10) Patent No.: US 8,029,976 B2
(45) Date of Patent: Oct. 4, 2011

(54) OPTICAL RECORDING MEDIUM AND OPTICAL RECORDING-REPRODUCING METHOD USING THEREOF

(75) Inventors: Yutaka Wada, Miyagi (JP); Masatsugu Suwabe, Miyagi (JP); Junko Shimada, Miyagi (JP); Toru Yano, Chiba (JP); Keiji Oya, Saitama (JP); Koichi Shigeno, Tokyo (JP)

(73) Assignees: Sony Corporation, Tokyo (JP); Adeka Corporation, Tokyo (JP)

( * ) Notice: Subject to any disclaimer, the term of this patent is extended or adjusted under 35 U.S.C. 154(b) by 701 days.

(21) Appl. No.: 11/257,325

(22) Filed: Oct. 24, 2005

(65) Prior Publication Data

US 2006/0110566 A1 May 25, 2006

(30) Foreign Application Priority Data

Oct. 27, 2004 (JP) ................................ P2004-312944

(51) Int. Cl.
*G11B 7/24* (2006.01)

(52) U.S. Cl. .............. 430/270.21; 430/945; 430/270.14; 428/64.8; 369/288; 369/284

(58) Field of Classification Search ........................ None
See application file for complete search history.

(56) References Cited

U.S. PATENT DOCUMENTS 4,600,625 A * 7/1986 Abe et al. ...................... 428/167
(Continued)

FOREIGN PATENT DOCUMENTS

JP 1999-227331 8/1999
(Continued)

OTHER PUBLICATIONS

Muramatsu et al. "Physical characteristics and the format of digital versatile disc-recordable" Jpn. J. Appl. Phys. vol. 40 p. 1789-1802 (2001).*
Skoog, D.A., "Instrumental Analysis", pp. 149-150 (1980).*
Taiwanese Search Report, Taiwanese Patent Office, Jan. 28, 2008.
(Continued)

*Primary Examiner* — Martin Angebranndt
(74) *Attorney, Agent, or Firm* — SNR Denton US LLP

(57) ABSTRACT

Disclosed is to provide with an optical recording medium of a write-once type in which an excellent recording characteristic can be obtained over low speed recording to high speed recording.
In an optical recording medium having a recording layer that contains an organic dye, the recording layer is configured to have at least an organic dye expressed by a general formula shown in the following chemical formula 1 (in this formula, R1 represents an alkyl group of carbon number 1 through 4, R2 and R3 represent respectively an alkyl group of carbon number 1 through 4 and a benzyl group or group forming three to six-member ring by coupling, each of Y1 and Y2 represents independently an organic group, and X represents $ClO_4$, $FB_4$, $PF_6$, and $SbF_6$) and an organic dye expressed by a general formula shown in the following chemical formula 2 (in this formula, R1 and R4 represent an alkyl group of carbon number 1 through 4, R2 and R3 represent respectively an alkyl group of carbon number 1 through 4 and a benzyl group or group forming three to six-member ring by coupling, each of Y1 and Y2 represents independently an organic group, and X represents $ClO_4$, $FB_4$, $PF_6$, and $SbF_6$).

[Chemical Formula 1]

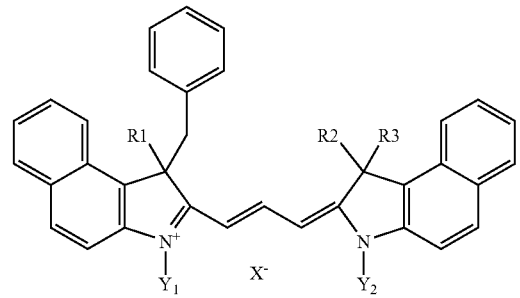

[Chemical Formula 2]

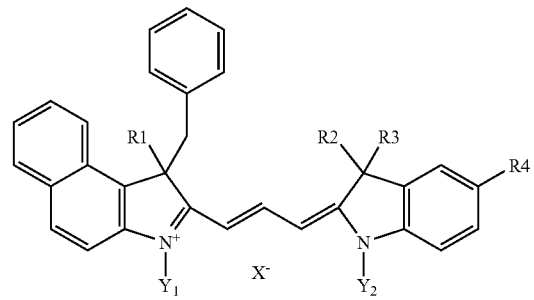

11 Claims, 3 Drawing Sheets

U.S. PATENT DOCUMENTS

| | | | |
|---|---|---|---|
| 5,328,741 A * | 7/1994 | Yanagisawa et al. | 428/64.8 |
| 6,835,433 B2 * | 12/2004 | Yeh et al. | 428/64.1 |
| 7,316,836 B2 * | 1/2008 | Wada et al. | 428/64.1 |
| 2003/0224293 A1* | 12/2003 | Oya et al. | 430/270.14 |
| 2004/0058274 A1* | 3/2004 | Fukuzawa et al. | 430/270.11 |
| 2004/0109973 A1* | 6/2004 | Yeh et al. | 428/64.4 |
| 2004/0161701 A1 | 8/2004 | Hohsaka | |
| 2005/0031993 A1* | 2/2005 | Yano et al. | 430/270.21 |
| 2006/0286483 A1* | 12/2006 | Yano et al. | 430/270.21 |
| 2008/0033179 A1* | 2/2008 | Yano et al. | 546/277.4 |

FOREIGN PATENT DOCUMENTS

| | | |
|---|---|---|
| JP | 2000-343819 | 12/2000 |
| JP | 2002-274044 * | 9/2002 |
| JP | 2003-231359 * | 8/2003 |

OTHER PUBLICATIONS

Japanese Office Action for Japanese Application No. 2004-312944 dated May 21, 1999.

* cited by examiner

OPTICAL RECORDING MEDIUM AND OPTICAL RECORDING-REPRODUCING METHOD USING THEREOF

CROSS REFERENCES TO RELATED APPLICATIONS

The present invention contains subject matter related to Japanese Patent Application JP 2004-312944 filed in the Japanese Patent Office on Oct. 27, 2004, the entire contents of which being incorporated herein by reference.

BACKGROUND OF THE INVENTION

1. Field of the Invention

The present invention relates to an optical recording medium, more particularly an optical recording medium using an organic dye as a recording layer, and an optical recording-reproducing method using thereof.

2. Description of the Related Art

As an optical recording medium, an optical recording medium using an optical organic dye material in a recording layer is configured to have a recording layer whose principal ingredient is an organic dye, and also a reflection layer, a protection layer, and the like according to a necessity, on a transparent substrate such as a plastic, and information is recorded in high density by scanning laser light on a surface of this recording layer and by forming a pit only in a portion of the irradiated surface.

An organic dye recording medium which is represented by a CD-R (write-once type CD: Compact Disc, registered trademark) is widely accepted in the market as a backup of data, image, and the like and also as a music use since a structure is simple and it is possible to manufacture at a low cost. However, there is a desire for a recording medium having a further larger capacity along with a rapid progress of a computer in recent years, and a demand for the optical recording medium using the organic dye is shifting from the CD-R and the like to a DVD-R and DVD+R (right-once type DVD: Digital Versatile Disc, registered trademark).

Recording of information onto the optical recording medium using the organic dye is performed in heat mode. When the laser light is irradiated to the recording layer, the organic dye of the irradiated portion is resolved by absorbing the laser light to generate heat. Since the portion where the organic dye is resolved has a different reflectivity from an unresolved portion, a pit is to be formed inside the recording layer. Accordingly, a mechanism to absorb the heat becomes important in the optical recording medium using the organic dye.

An amount of heat necessary for resolving the organic dye inside the recording layer is determined by a light absorption spectrum. Generally, when the absorption of light becomes large in a certain wavelength, a recording sensitivity becomes high although a reflectivity is decreased. On the contrary, when the absorption becomes small, the reflectivity becomes high although the recording sensitivity is decreased.

Although a reflectivity characteristic and a recording sensitivity characteristic of the recording layer are important in the optical recording medium using the organic dye, those characteristics have a mutually close correlation as described hereinbefore and therefore give a big influence on a recording characteristic of the optical recording medium. In the DVD, the laser light of a shorter wavelength of 650 nm (DVD-R) or 655 nm (DVD+R) than the CD is used in order to increase a recording density, and the organic dye which has been previously used for the CD-R may not be used for the DVD-R and DVD+R due to a reason that the absorption is so large in this wavelength range as to shift greatly from the optimum recording sensitivity.

Moreover, even in the DVD-R and DVD+R, high speed recording is demanded similarly to the CD-R. In a recording material to perform the high speed recording, it is required that not only the reflectivity is high, but also the recording sensitivity is a high sensitivity, and a resolving speed of a dye due to heat is fast.

Various dye materials suitable for application to the DVD-R and the like have been proposed (for example, refer to patent references 1 and 2).

However, a recording-reproducing characteristic at the time of high speed recording is not sufficiently studied.

In addition, a deterioration of a signal characteristic at the time of low speed recording is observed when the material is optimized to the high speed recording by simply increasing the resolving speed of the dye, and also similarly an opposite case is that a signal characteristic at the time of high speed recording is deteriorated when the material is optimized to the low speed recording.

Furthermore, there is a possibility that a light stability characteristic deteriorates in the organic dye recording medium of high sensitivity.

Therefore, it is very difficult to satisfy simultaneously all of the recording characteristic and the light stability characteristic over low speed to high speed recording in one single organic dye recording medium.

[Patent Reference 1] Japanese patent application publication No. 2002-52829

[Patent Reference 2] Japanese patent application publication No. 2003-231359

SUMMARY OF THE INVENTION

The present invention aims at providing with an optical recording medium which enables to obtain an excellent recording characteristic over low speed recording to high speed recording in the optical recording medium of the write-once type such as the DVD-R and DVD+R, and an optical recording-reproducing method using thereof.

In order to solve the above-described problems, an optical recording medium according to an embodiment of the present invention is configured to have a recording layer that contains an organic dye, wherein the recording layer has at least an organic dye that is expressed by a general formula shown in the following chemical formula 1 (in this formula, R1 represents an alkyl group of carbon number 1 through 4, R2 and R3 represent respectively an alkyl group of carbon number 1 through 4 and a benzyl group or group forming three to six-member ring by coupling, each of Y1 and Y2 independently represents an organic group, and X represents $ClO_4$, $BF_4$, $PF_6$, and $SbF_6$) and an organic dye that is expressed by a general formula shown in the following chemical formula 2 (in this formula, R1 and R4 represent an alkyl group of carbon number 1 through 4, R2 and R3 represent respectively an alkyl group of carbon number 1 through 4 and a benzyl group or group forming three to six-member ring by coupling, each of Y1 and Y2 independently represents an organic group, and X represents $ClO_4$, $BF_4$, $PF_6$, and $SbF_6$)

[Chemical Formula 1]

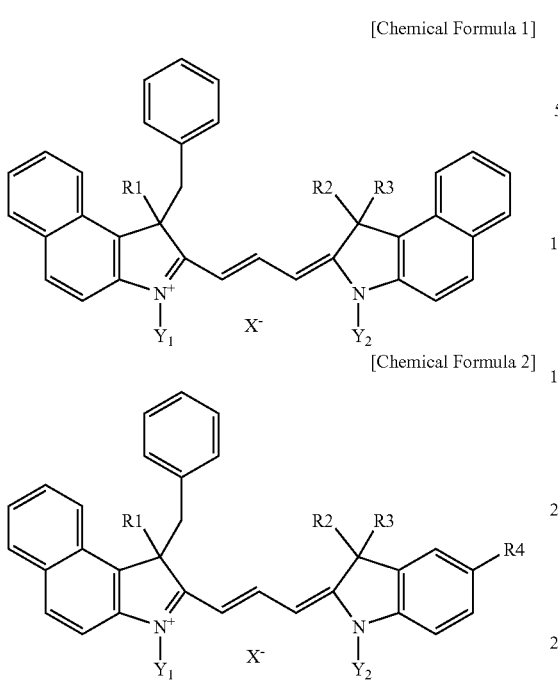

[Chemical Formula 2]

Further, an optical recording-reproducing method according to an embodiment of the present invention uses the optical recording medium having the above-described configuration of the embodiment of the present invention.

The optical recording medium according to the embodiment of the present invention is configured to have the recording layer mixing the organic dyes expressed in the general formulas of the above-described chemical formulas 1 and chemical formula 2 as described hereinbefore, and thereby it is possible to suppress a jitter over the low speed recording to high speed recording that is from a 1× speed to a 16× speed, which has not been previously obtained, and an excellent recording-reproducing characteristic can be obtained.

Furthermore, it is possible to provide with an optical recording-reproducing method that enables excellent recording and reproduction at least over 1× speed recording to 16× speed recording by performing the recording and reproduction using such optical recording medium.

According to the optical recording medium of the embodiment of the present invention, an excellent recording-reproducing characteristic can be obtained over the low speed recording to high speed recording as explained hereinbefore.

Moreover, in the optical recording medium of the embodiment of the present invention, the jitter and reflectivity can be maintained in an excellent range by choosing a grooving depth D of a groove formed in a substrate to become:

100 nm $\leq D \leq$ 200 nm so that an excellent recording-reproducing characteristic can be obtained over the 1× speed recording to 16× speed recording.

Also, in the optical recording medium of the embodiment of the present invention, the jitter can be maintained in an excellent range by choosing a width of the groove formed in the substrate to become:

230 nm $\leq Wg \leq$ 400 nm so that an excellent recording-reproducing characteristic can be obtained over the 1× speed recording to 16× speed recording.

Moreover, in the optical recording medium of the embodiment of the present invention, it is possible to obtain an excellent recording-reproducing characteristic over the 1× speed recording to 16× speed recording by using a material of a structural formula shown in the following chemical formula 3 as the organic dye shown in the above-described chemical formula 1.

[Chemical Formula 3]

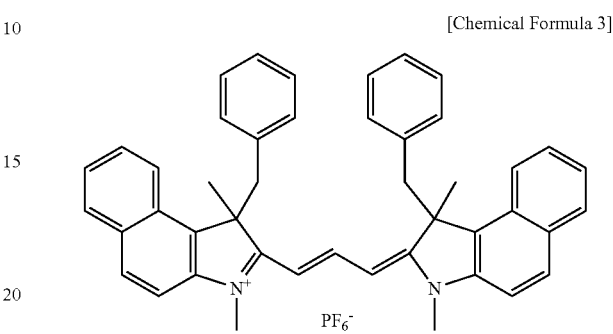

Also, in the optical recording medium of the embodiment of the present invention, it is possible to obtain an excellent recording-reproducing characteristic over the 1× speed recording to 16× speed recording by using a material of a structural formula shown in the following chemical formula 4 as the organic dye shown in the above-described chemical formula 2.

[Chemical Formula 4]

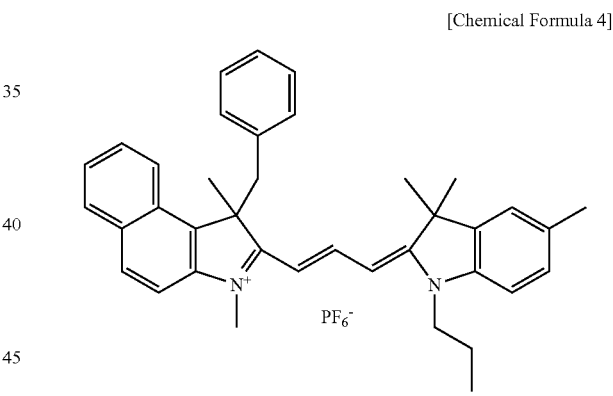

Also, in the optical recording medium of the embodiment of the present invention, when a weight of the organic dye shown in the above-described chemical formula 1 is put as W1 and a weight of the organic dye shown in the above-described chemical formula 2 is put as W2, a range of recording power can be chosen within an appropriate range over the low speed recording to high speed recording by configuring as:

0.1 $\leq W2/(W1+W2) \leq$ 0.8

Further, in the optical recording medium of the embodiment of the present invention, the light stability can be improved by adding a deactivation agent to the recording layer.

In addition, when the weight of the organic dye shown in the above-described chemical formula 1 is put as W1, the weight of the organic dye shown in the above described chemical formula 2 as W2, and an added amount of the deactivation agent as W3 in this optical recording medium, it is possible to improve the light stability, also to suppress the jitter with certainty, and to obtain an excellent recording-reproducing characteristic by configuring as:

$$0.08 < W3/(W1+W2+W3) \leq 0.35$$

Also, in the optical recording medium of the embodiment of the present invention, when an optical density (Optical Density) in a maximum wavelength of the absorption of the organic dye is put as OD, it is possible to suppress the jitter with further certainty over the low speed recording to high speed recording and to obtain an excellent recording-reproducing characteristic by configuring as:

$$0.25 \leq OD \leq 0.70$$

Furthermore, it becomes possible to provide with an optical recording-reproducing method enabling unfailingly an excellent recording-reproducing characteristic over the recording speed at least from the 1× speed to the 16× speed by performing the recording and reproduction using the optical recording medium of the above-described configuration of the embodiment of the present invention.

DESCRIPTION OF THE PREFERRED EMBODIMENTS

An example of the best mode for carrying out the present invention is explained hereinafter, but the present invention is not limited to an embodiment described hereinafter.

The present invention relates to an optical recording medium of a disk type, for example, which has a recording layer that is made of an organic dye, more particularly provides with an optical recording medium of an organic dye type which can comply with a DVD−R and DVD+R disk and also which enables high speed recording, and an optical recording-reproducing method using thereof.

Figure 1:
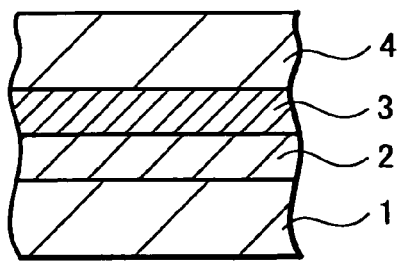
FIG. 1 is an outline cross-sectional configuration diagram showing one example of an optical recording medium according to an embodiment of the present invention.

An outline cross-sectional configuration of an essential portion of an optical recording medium according to one embodiment of the present invention is shown in FIG. 1. The optical recording medium is configured such that a recording layer 2 is formed as a film on a substrate 1 having an optical transparency whose thickness is 0.6 mm, for example, by a spin coat method and the like, a reflection layer 3 made of silver, for example, among silver, silver alloy, Al, Al alloy, gold, and the like is laminated thereon by a sputtering method and the like, and a substrate 4 having an optical transparency whose thickness is 0.6 mm, for example, is bonded together through an ultraviolet curing resin and the like.

TFP, for example, among tetra-fluoropropanol (TFP), octa-fluoropentanol (OFP), and the like which become a solvent of an organic dye can be used as a coating liquid for the organic dye of the recording layer 2. As the organic dye of the recording layer 2, it is possible to use the dye of the structural formula shown in the above-described chemical formula 3, for example, within the general formula shown in the above-described chemical formula 1.

In addition, among various organic dyes, it is possible to use the dye of the structural formula shown in the above-described chemical formula 4, for example, within the general formula shown in the above-described chemical formula 2.

The optical recording medium is produced by using those materials, to which a recording-reproducing characteristic is examined. A result thereof is explained hereinafter.

When a transmission factor in a maximum wavelength λmax of the absorption is put as T, the optical density OD (Optical Density) of the recording layer 2 is defined as:

$$OD = -\log(T)$$

and is made into OD=0.50 in an example described hereinafter.

Figure 2:
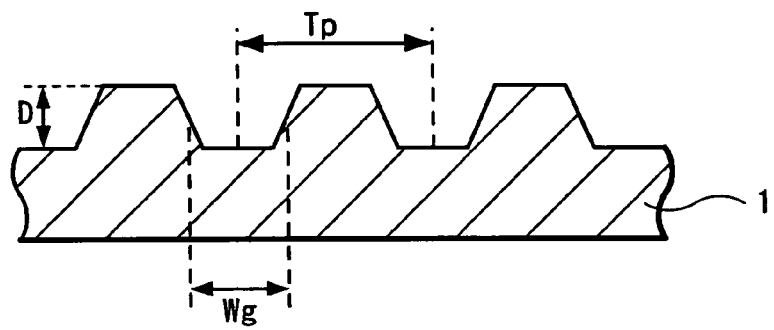
FIG. 2 is an outline cross-sectional configuration diagram showing an essential portion of one example of the optical recording medium according to the embodiment of the present invention.

The substrate that is used has a shape shown in the outline cross-sectional configuration diagram of FIG. 2, and is made such that a track pitch Tp is 0.74 μm and the grooving depth D and width Wg of the groove are respectively 150 nm and 350 nm. Here, a width of middle points in slopes between a land portion and a groove portion is defined as the groove width Wg. A DDU-1000 (model name) manufactured by Pulstec, Inc. is used for recording and reproduction of a signal. A wavelength of laser light of this evaluation equipment is 655 nm, a numerical number NA of a focusing lens is 0.65, and a jitter value of a reproduced signal is measured when an EFM plus signal used for the DVD is recorded at random by a shortest mark length 0.40 μm.

Recording conditions are set as 1× speed recording (line speed 3.5 m/s) and 2.4× speed recording (line speed 8.4 m/S) using the Pulse Strategy according to the standard of the 1× speed recording method of the DVD+R, also 4× speed recording (line speed 14.0 m/s) using the Block Strategy according to the standard of the 4× speed recording method of the DVD+R, and furthermore 8× speed recording (line speed 27.9 m/s) and 16× speed recording (line speed 55.8 m/s) using the Castle Strategy according to the standard of the 8× speed recording method of the DVD+R, and the jitter value is measured to the recording power at the time of performing the reproduction in the 1× speed. Since the jitter value indicates variations on a time axis of the recording mark and space at the time of reproduction, the jitter value is an index indicating an accuracy of the recorded mark and space, which means that the smaller the jitter value is, the higher is the signal quality.

When the weight of the material shown in the above-described chemical formula 3 is put as W1 and the weight of the material shown in the above-described chemical formula 4 as W2 among the organic dyes of the recording layer, the jitter value by each recording speed method is measured at the time that a weight ratio is W2/(W1+W2)=0.5. A result thereof is shown in the following table 1.

TABLE 1

|  | 1× Speed | 2.4× Speed | 4× Speed | 8× Speed | 16× Speed |
|---|---|---|---|---|---|
| Jitter[%] | 5.9 | 6.1 | 6.1 | 6.2 | 6.4 |

From this table 1, it is understood that the jitter value is significantly lower than an upper limit value 9.0% of the standard of the DVD+R over all the recording speeds from the 1× speed to the 16× speed and a sufficient signal quality can be obtained.

Figure 3:
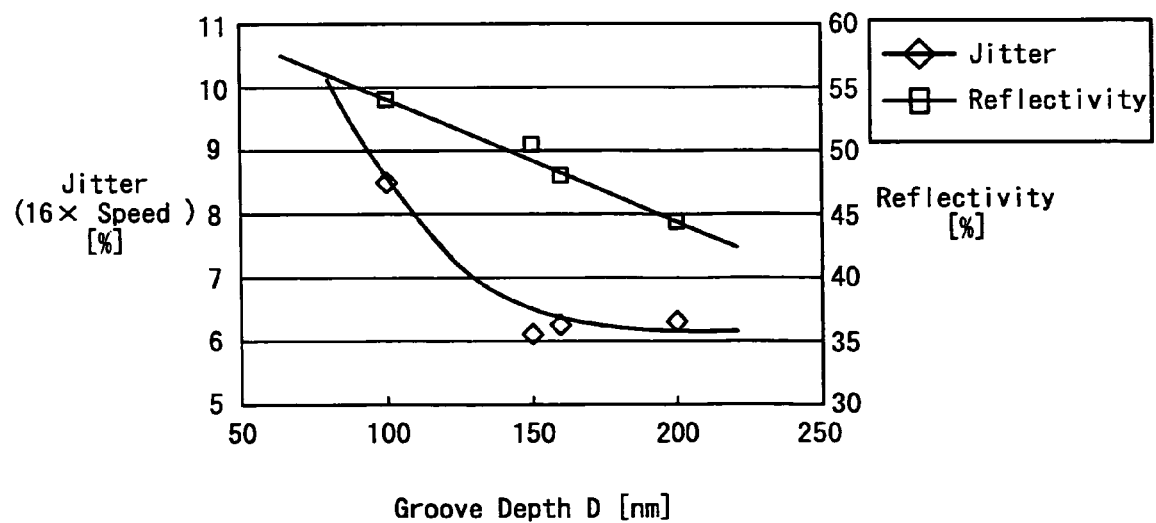
FIG. 3 is a diagram showing a change in jitter and reflectivity to a groove depth in the optical recording medium according to the embodiment of the present invention.

Next, a result of a study with respect to the grooving depth D of the groove is shown in FIG. 3. The recording layer under the condition of the above-described weight ratio of W2/(W1+W2)=0.5 is used, and a bottom value and reflectivity of the jitter at the time of 16× speed recording is measured in an area where the grooving depth D of the groove is 100 nm≦D≦200 nm.

According to the result shown in FIG. 3, the jitter value is sufficiently lower than 9% in D≧100 nm, and the reflectivity in D=200 nm is lower than 45% that is a lower limit of the standard of the write-once type DVD.

Then, it is understood that the groove depth satisfying the signal characteristic and reflectivity simultaneously is:

$$100\ nm \leq D \leq 200\ nm$$

Also, in case of suppressing the jitter into less than 8%, it is desirable that the groove depth D is:

$$110\ nm \leq D$$

Moreover, in case of suppressing further the jitter into less than 7%, it is more desirable that the groove depth D is:

$$130\ nm \leq D$$

In addition, when the reflectivity is brought into around 46%, it is desirable that the groove depth D is:

$$D \leq 190\ nm$$

and furthermore, when the reflectivity is brought into 47% or more, it is more desirable that the groove depth D is:

$$D \leq 180\ nm$$

Figure 4:
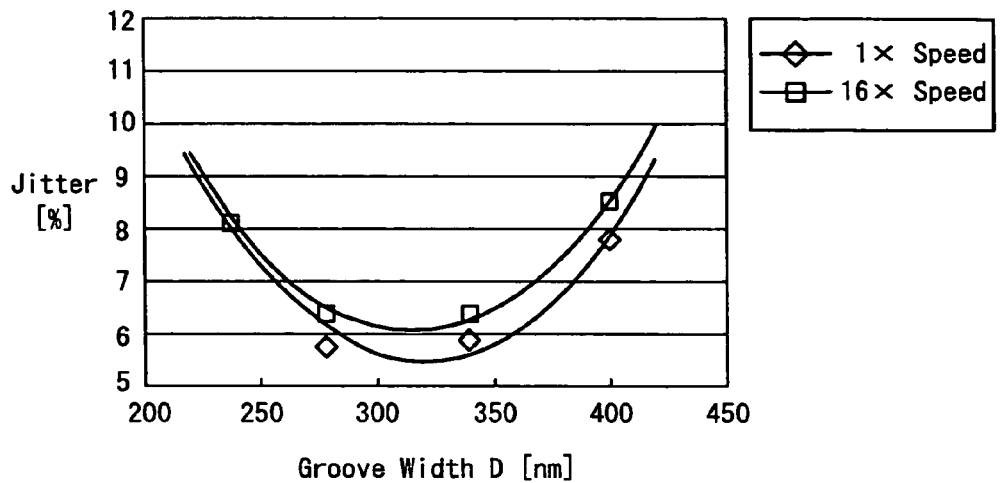
FIG. 4 is a diagram showing a change in jitter to a groove width in the optical recording medium according to the embodiment of the present invention.

FIG. 4 shows a result of a study with respect to the groove width Wg. The recording layer under the condition of the above-described weight ratio of W2/(W1+W2)=0.5 is used, the jitter values at the time of 1× speed recording and 16× speed recording are measured by setting the grooving depth D of the groove to 150 nm and changing the groove width Wg, and the jitter values in the optimum recording power are plotted. From this FIG. 4, it is understood that a condition of the groove width Wg under which a sufficient signal quality can be obtained over the 1× speed recording to 16× speed recording is:

$$230\ nm \leq Wg \leq 400\ nm$$

Also, in case of suppressing the jitter into 8% or less, it is desirable that the groove width Wg is:

$$240\ nm \leq D \leq 390\ nm$$

Moreover, in case of suppressing further the jitter into 7% or less, it is more desirable that the groove width is:

$$260\ nm \leq D \leq 370\ nm$$

Figure 5:
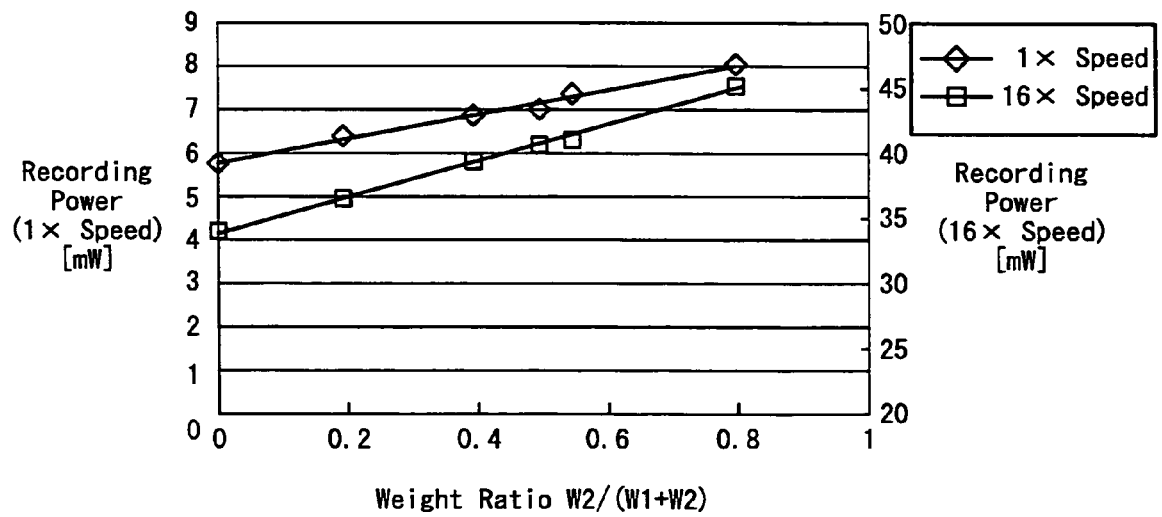
FIG. 5 is a diagram showing a change in recording power of 1× speed and 16× speed recording to a weight ratio of recording layer materials in the optical recording medium according to the embodiment of the present invention.

Next, a result of a study with respect to a compounding ratio of the organic dye of the structural formula shown in the above-described chemical formula 3 to the organic dye of the structural formula shown in the above-described chemical formula 4 is shown in FIG. 5. The grooving depth D and width Wg of the groove are respectively made into 150 nm and 350 nm. When the optimum recording power at the time of 1× speed recording and at the time of 16× speed recording is put as $P_0$, it is observed that the recording sensitivity shifts toward the low sensitivity side and the recording power increases as the W2/(W1+W2) increases.

Here, the weight ratio of W2/(W1+W2)=0.8 becomes the upper limit since it is desirable that the optimum recording power of the 16× speed recording is 45 mW or less.

A lower limit value is determined by the optimum recording power at the time of 1× speed recording, and the weight ratio of W2/(W1+W2)=0.1 becomes the lower limit since it is desired that the optimum recording power of the 1× speed recording is 6 mW or more. Accordingly, it is understood that a suitable weight ratio in this case is as follows:

$$0.1 \leq W2/(W1+W2) \leq 0.8$$

In addition, when the recording power at the time of 1× speed recording is brought into 6.5 mW or more and the recording power at the time of 16× speed recording is brought into 42 mW or less as more desirable conditions, it is understood that following is suitable as this weight ratio:

$$0.3 \leq W2/(W1+W2) \leq 0.65$$

Next, an optical recording medium is configured such that the organic dyes of the above-described chemical formula 3 and chemical formula 4 are used as the material of the recording layer and the weight ratio thereof is made into W2/(W1+W2)=0.5, and the light stability is examined.

In this example, a material of a structural formula shown in the following chemical formula 5 is added to the recording layer 2 as a deactivation agent.

[Chemical Formula 5]

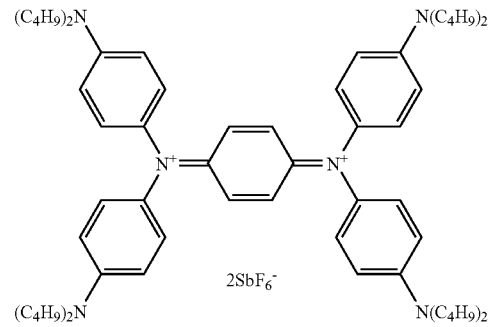

The weights of the materials shown in the above-described chemical formula 3 and chemical formula 4 are put as W1 and W2, the weight of the material shown in the above-described chemical formula 5 is put as W3, and an added amount of deactivation agent into the recording layer is changed so that W3/(W1+W2+W3) changes from 0.0 to 0.4.

A light stability test of the recording layer is performed by irradiating a xenon lamp from the side of the recording layer of the optical recording medium until becoming equivalent to the fifth grade color degradation of the blue scale (JIS standard) under an environment of temperature 37° C. and relative humidity 70% inside a test equipment.

Figure 6:
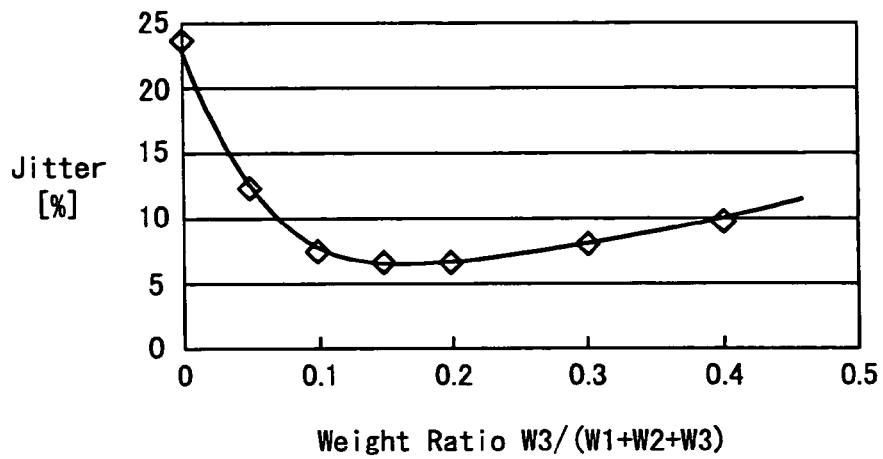
FIG. 6 is a diagram showing a change in jitter to a weight ratio of recording layer materials to which a deactivation agent is added in the optical recording medium according to the embodiment of the present invention.

FIG. 6 shows the jitter value at the time of performing the 16× speed recording to the optical recording medium after the xenon lamp is irradiated. From this FIG. 6, it is understood that the weight ratio W3/(W1+W2+W3) of the deactivation agent is suitable in the following range in order to suppress the jitter into 9% or less.

$$0.08 < W3/(W1+W2+W3) \leq 0.35$$

In addition, it is desirable that the weight ratio is in the following range in order to suppress the jitter lower.

$$0.1 \leq W3/(W1+W2+W3) \leq 0.3$$

In the above-described example, the study is made to a case that the material shown in the above-described chemical formula 5 is used as the deactivation agent, but an almost similar effect can be obtained even in a case that another deactivation agent such as a deactivation agent, for example, shown in the following chemical formula 6 or chemical formula 7 is used.

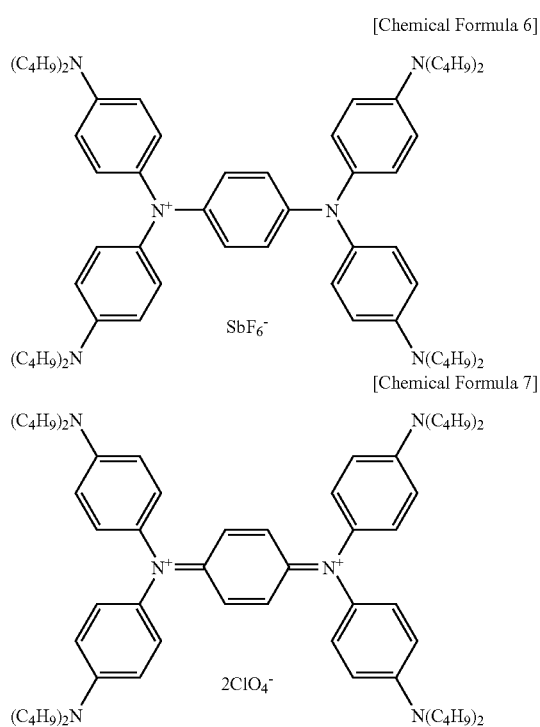

[Chemical Formula 6]

[Chemical Formula 7]

Furthermore, in order to improve the light stability, a phthalocyanine dye and azo system dye that are stable to light may be added inside the recording layer in addition to the above-described deactivation agent.

Next, a study is made to the optical density (OD) of the recording layer. A compounding ratio of the recording layer materials is set such that the weight ratio of the organic dyes shown in the above-described chemical formula 3 and chemical formula 4 is $W2/(W1+W2)=0.5$ and also the weight ratio of the deactivation agent shown in the above-described chemical formula 5 is $W3/(W1+W2+W3)=0.2$ in order to produce an optical recording media whose optical density of the recording layer is changed.

In this example, the optical recording medium is produced under five conditions in which the optical densities (OD) of the organic dye film in the maximum wavelength of the absorption are 0.25, 0.40, 0.50, 0.60, and 0.70, and the jitter values are measured respectively at the time of 1× speed recording and at the time of 16× speed recording. A result of this measurement is shown in FIG. 7.

Figure 7:
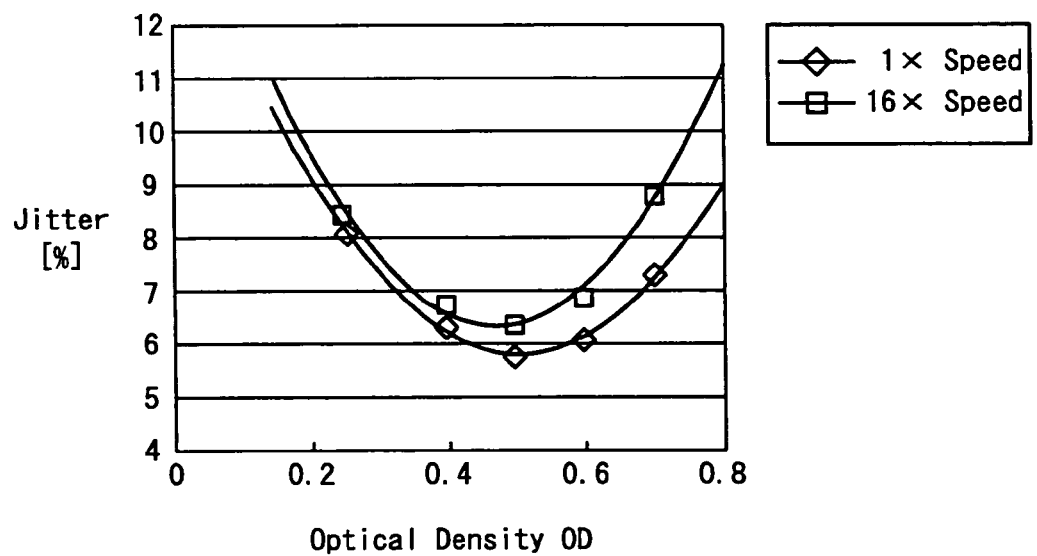
FIG. 7 is a diagram showing a change in jitter to an optical density of a recording layer in the optical recording medium according to the embodiment of the present invention.

From the result shown in FIG. 7, it is understood that the jitter at the time of 16× speed recording is lower than 9% when the optical density (OD) of the recording layer is 0.25 and the jitter becomes 9% in case that the optical density is made to be OD=0.70. Therefore, it is understood that a range of the optical density OD in which a sufficient signal quality can be obtained is:

$$0.25 \leq OD \leq 0.70$$

Also, in case of suppressing the jitter into 8% or less, it is desirable that the optical density OD is:

$$0.35 \leq OD \leq 0.60$$

Moreover, in case of suppressing the jitter further into 7% or less, it is more desirable that the optical density OD is:

$$0.35 \leq OD \leq 0.60$$

According to the optical recording medium of the embodiment of the present invention, it becomes possible to provide with the optical recording medium in which the signal characteristic satisfying sufficiently the standard of the write-once type DVD can be obtained over the wide range of recording speed from the 1× speed to the 16× speed in an optical system of the DVD type as explained hereinbefore.

In addition, it is possible to provide with the optical recording medium of the organic dye type having more excellent light stability by adding the deactivation agent.

It should be noted that the optical recording medium according to the embodiment of the present invention is not limited to each embodiment described hereinbefore but a similar effect can be obtained even when the present invention is applied to an optical recording medium that conforms or approximately conforms to the standard of the DVD+R type, or an optical recording medium that conforms or approximately conforms to the standard of the DVD-R type.

Here, numerical values including a light wavelength for recording and reproduction, a numerical aperture of a condensing lens, a 1× line speed, and a tolerance of a shortest mark length according to the standard of the DVD+R type and DVD-R type optical recording medium are shown in the following table 2.

TABLE 2

|  | DVD + R | DVD − R |
|---|---|---|
| Light Wavelength for Recording | 655 nm + 10 nm/−5 nm | 650 nm + 10 nm/−5 nm |
| Light Wavelength for Reproduction | 655 nm + 10 nm/−5 nm | 650 nm ± 5 nm |
| Numerical Aperture NA of Focusing Lens | 0.65 ± 0.01 | 0.60 ± 0.01 |
| 1× Line Speed | 3.49 ± 0.03 m/s | 3.49 ± 0.03 m/s |
| Shortest Mark Length | 0.40 μm ± 0.003 μm | 0.40 μm ± 0.003 μm |

It should be noted that the light wavelength of 655 nm+10 nm/−5 nm for recording and reproduction of the DVD+R means that the tolerance is +10 nm and also −5 nm, and similarly the light wavelength of 650 nm+10 nm/−5 nm for recording of the DVD-R means that the tolerance is +10 nm and also −5 nm in the above-described table 2.

In addition, it should be clear that various modifications and alterations other than those described hereinbefore are possible within a scope not departing from the configuration of the present invention such that the present invention can be also applied to a case that a recording layer made of a dye material, for example, is made into a two-layers configuration in a configuration of an optical recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium comprising a recording layer said recording layer further comprising:
   an organic dye expressed by a chemical formula 1; and
   an organic dye expressed by a chemical formula 2
   wherein,
      a weight ratio of the organic dyes is $0.1 \leq W2/(W1+W2) \leq 0.8$, where W1 is a weight of the organic dye represented by chemical formula 1 and W2 is a weight of the organic dye represented by chemical formula 2,
      the weight ratio is effective to reduce the jitter value to 6.4% or below when recording and/or reproduction speeds ranging from 1× to 16×,
   Chemical Formula 1 is:

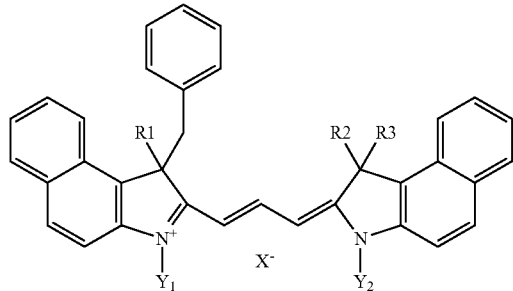

where (1) R1 is an alkyl group of carbon number 1 through 4, (2) each of R2 and R3 is an alkyl group of carbon number 1 through 4 and a benzyl group or are combined to form a group forming three to six-member ring by coupling, (3) each of Y1 and Y2 is independently an organic group, and (4) X represents $ClO_4$, $BF_4$, $PF_6$ and $SbF_6$, and
   Chemical Formula 2 is

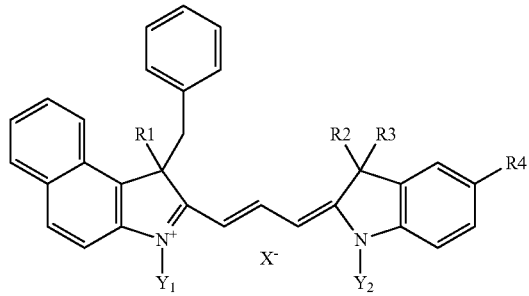

where (1) each of R1 and R4 is an alkyl group of carbon number 1 through 4, (2) each of R2 and R3 is an alkyl group of carbon number 1 through 4 and a benzyl group or are combined to form a group forming three to six-member ring by coupling, (3) each of Y1 and Y2 is an organic group and (4) X is selected from a group consisting of $ClO_4$, $BF_4$, $PF_6$ and $SbF_6$.

2. The optical recording medium according to claim 1, wherein the optical recording medium includes a substrate having a groove with a depth D and 100 nm$\leq$D$\leq$200 nm.

3. The optical recording medium according to claim 1, wherein the optical recording medium includes a substrate having a groove with a width Wg and 230 nm$\leq$Wg$\leq$400 nm.

4. The optical recording medium according to claim 1 wherein the optical recording medium is comprised such that the organic dye shown in said chemical formula 1 is a material of a structural formula shown in the following chemical formula 3:

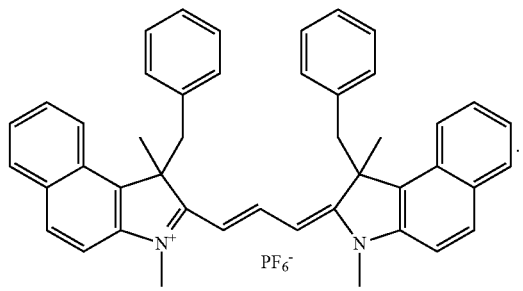

5. The optical recording medium according to claim 1, wherein the optical recording medium is comprised such that the organic dye shown in said chemical formula 2 is a material of a structural formula shown in the following chemical formula 4:

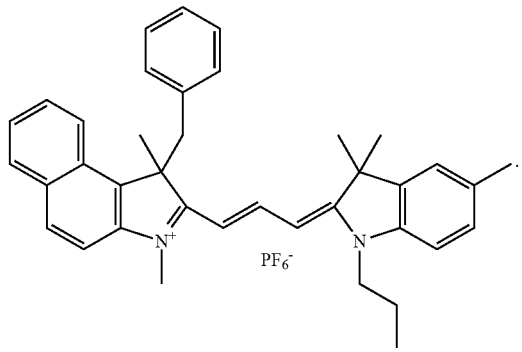

6. The optical recording medium according to claim 1, wherein a deactivation agent is added to said recording layer.

7. The optical recording medium according to claim 6, wherein the weight ratio is comprised as:

$$0.08 < W3/(W1+W2+W3) \leq 0.35$$

where (1) a weight of the organic dye shown in said chemical formula 1 is W2, (2) a weight of the organic dye shown in said chemical formula 2 is W2, (3) a weight of said deactivation agent is W3, and (4) the weight ratio is effective to reduce the jitter value to 6.4% or below when recording and/or reproduction speeds ranging from 1× to 16×.

8. The optical recording medium according to claim 1, wherein the optical recording medium has an optical density OD in a maximum wavelength of an adsorption of said organic dye and $0.25 \leq OD \leq 0.70$.

9. A method for optical recording-reproducing comprising the steps of:
   recording-reproducing information using light onto an optical recording medium comprising a recording layer, wherein,
      said recording layer comprises an organic dye expressed by a general formula expressed by a general formula shown in a chemical formula 1:

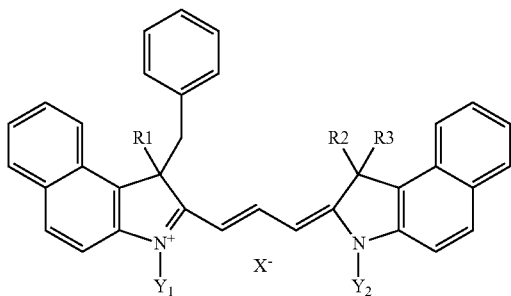

where (1) R1 is an alkyl group of carbon number 1 through 4, (2) each of R2 and R3 is an alkyl group of carbon number 1 through 4 and a benzyl group or are combined to form a group forming three to six-member ring by coupling, (3) each of Y1 and Y2 is an organic group, and (4) X is selected from a group consisting of $ClO_4$, $BF_4$, $PF_6$ and $SbF_6$, and an organic dye expressed by a general formula shown in a chemical formula 2:

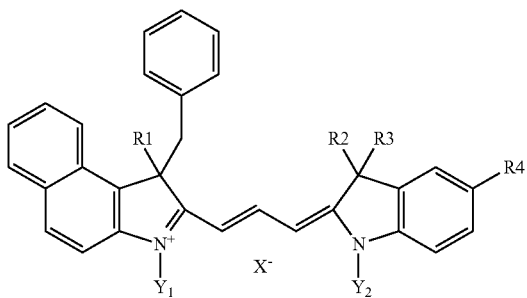

where (1) each of R1 and R4 is an alkyl group of carbon number 1 through 4, (2) each of R2 and R3 is an alkyl group of carbon number 1 through 4 and a benzyl group or are combined to form a group forming three to six-member ring by coupling, (3) each of Y1 and Y2 is an organic group and (4) X is selected from a group consisting of $ClO_4$, $BF_4$, $PF_6$ and $SbF_6$, a weight ratio of the organic dyes is $0.1 \leq W2/(W1+W2) \leq 0.8$, where (1) W1 is a weight of the organic dye represented by chemical formula 1 and (2) W2 is a weight of the organic dye represented by chemical formula 2, and the weight ratio is effective to reduce the jitter value to 6.4% or below when recording and/or reproduction speeds ranging range from 1× to 16×.

10. The method for optical recording-reproducing according to claim 9, wherein:
    a wavelength of light for recording and reproduction of said optical recording medium is 655 nm+10 nm/−5 nm,
    a numerical aperture NA of a focusing lens that focuses said laser light onto said optical recording medium is 0.65±0.01,
    a shortest mark length of information onto said optical recording medium is 0.40 μm 0.003 μm,
    a 1× line speed is 3.49±0.03 m/s, and
    a track pitch of said optical recording medium is 0.74 μm±0.03 μm.

11. The method for optical recording-reproducing according to claim 9 wherein:
    a wavelength of light for reproduction of said optical recording medium is 650 nm±5 nm,
    a wavelength of light for recording is 650 nm+10 nm/−5 nm, a numerical aperture NA of a focusing lens that focuses said laser light onto said optical recording medium is 0.60±0.01,
    a shortest mark length of information to be recorded onto said optical recording medium is 0.40 μm±0.003 μm,
    a 1× line speed is 3.49 m/s±0.03 m/s, and
    a track pitch of said optical recording medium is 0.74 μm±0.03 μm.

* * * * *